July 9, 1968  H. A. EIDAM  3,391,465
EFFECTIVE DIAMETER GAUGE

Filed April 28, 1966  7 Sheets-Sheet 1

July 9, 1968  H. A. EIDAM  3,391,465
EFFECTIVE DIAMETER GAUGE

Filed April 28, 1966  7 Sheets-Sheet 3

July 9, 1968 H. A. EIDAM 3,391,465
EFFECTIVE DIAMETER GAUGE
Filed April 28, 1966 7 Sheets-Sheet 4

July 9, 1968 H. A. EIDAM 3,391,465
EFFECTIVE DIAMETER GAUGE

Filed April 28, 1966 7 Sheets-Sheet 6

United States Patent Office 3,391,465
Patented July 9, 1968

3,391,465
EFFECTIVE DIAMETER GAUGE
Harry Augustus Eidam, Reading, Pa., assignor to The Carpenter Steel Company, Reading, Pa., a corporation of New Jersey
Filed Apr. 28, 1966, Ser. No. 545,913
12 Claims. (Cl. 33—178)

This invention relates to a gauge, and more particularly to a gauge for measuring the effective diameter and the out-of-roundness of rod or bar-shaped members.

Commercial rounds in the form of rod or bar stock such as produced in a steel mill by subjecting a billet to a succession of hot rolling, cold drawing and grinding operations are not truly circular in cross section. Such products are manufactured to meet prescribed tolerances, depending upon the intended use of the parts to be formed therefrom and these tolerances usually specify a standard ring gauge through which the round is to pass and the limits of tolerable out-of-roundness. More accurately, out-of-roundness tolerance is specified as the maximum tolerable variation in radius of the round.

Depending upon the equipment used in forming, the round may have an even or odd number of sides or lobes. With an even number of lobes, the round is readily sized and presents no great problem. On the other hand, conventional comparators and gauges are entirely unsuited for measuring out-of-roundness when the round has an odd number of lobes for in such a case, the round will have a substantially constant diameter as measured by a micrometer or snap gauge. While a precision spindle provides accurate results no matter what the shape of the round may be, it is not at all suited for mass production methods. Various types of V-block gauges have been provided for testing rounds having an odd number of lobes but these have left much to be desired. In addition to being time-consuming in use, such gauges are only suitable for rounds having a specific number of lobes. This results from the fact that the required angle between the blocks forming the conventional V-block gauges varies with the number of lobes on the round and is determined, as for example, by the formula 180 minus 360/n in which n equals the number of lobes on the round being gauged. Thus, care must be exercised to insure that 3-lobed rounds are not measured in a gauge built for 5-lobed rounds, etc.

I have discovered that when a V-block gauge is constructed in accordance with my persent invention, rounds having 3, 5, 7 or more lobes may be gauged in the same V-block gauge. Not only is my gauge easier to use but it provides measurements or indications having the required degree of precision and also eliminates the need for determining the number of lobes on the round being measured. Furthermore, in addition to being used for gauging rounds having an odd number of lobes irrespective of the actual number of lobes thereon my gauge may be used for determining the number and position of the lobes on a commercial round.

In hitherto available V-block gauges, the indicator is usually mounted on the line bisecting the angle formed between the V-blocks although it has also been proposed to position the indicator so that it forms a 30 degree or 45-degree angle with the bisector of the V-block angle. Surprisingly, I have found that when the indicator is located on a line normal to the V-block angle bisector and the V-block angle is 90 degrees, the difficulties heretofore encountered with V-block gauges, such as the need for selecting the proper V-block angle and the appropriate correction factor (to be used with a particular type of round) are completely eliminated. This has been verified by a large number of tests on rounds having a wide variation both in size and in number of lobes.

The present invention, as well as further objects and advantages thereof will be apparent from the following description thereof and the accompanying drawings in which.

Figure 1:
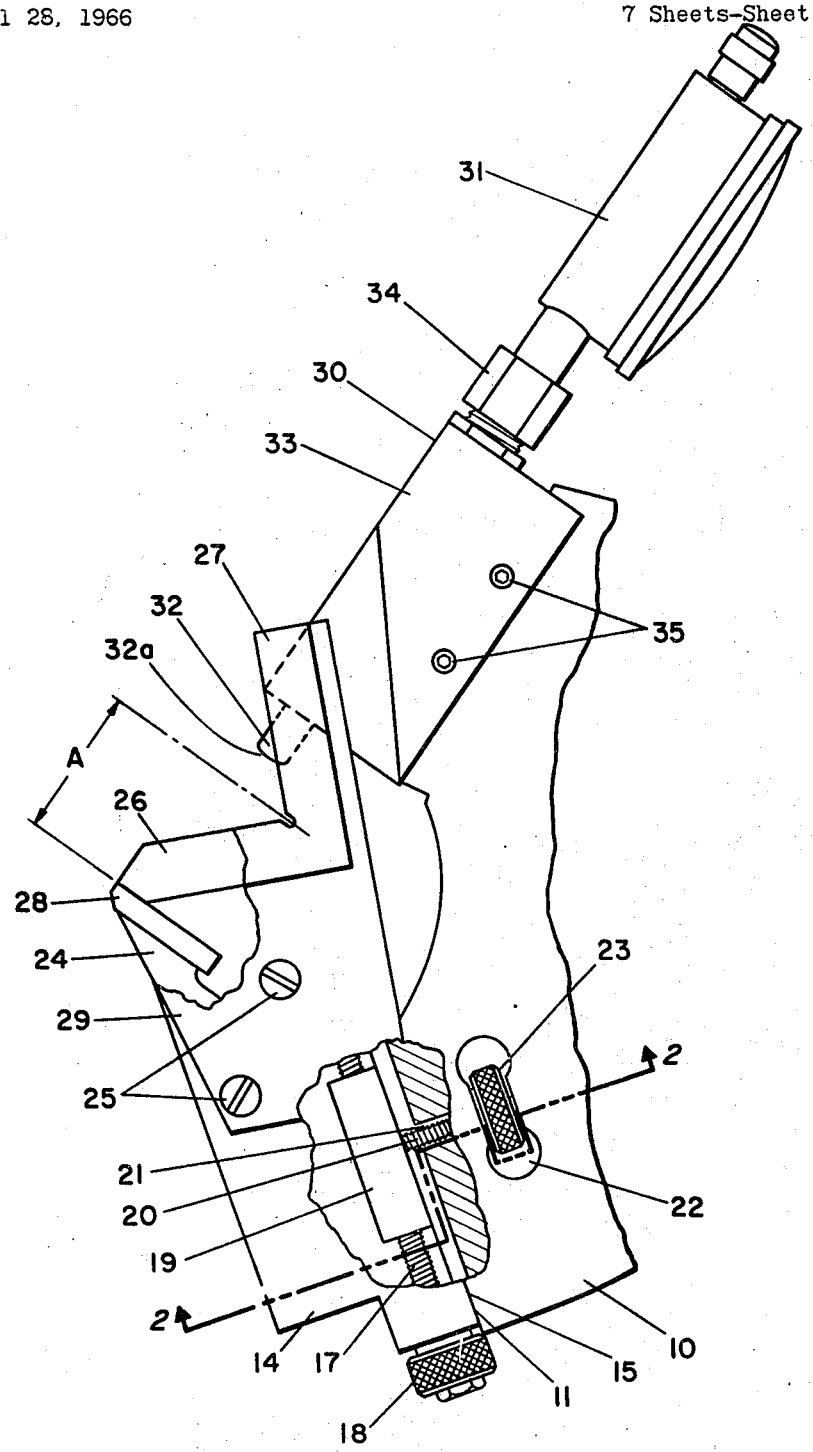
FIGURE 1 is a side elevational view of a preferred embodiment of an effective diameter gauge made in accordance with the present invention and partially cut away to show more clearly the details of construction.
Figure 2:
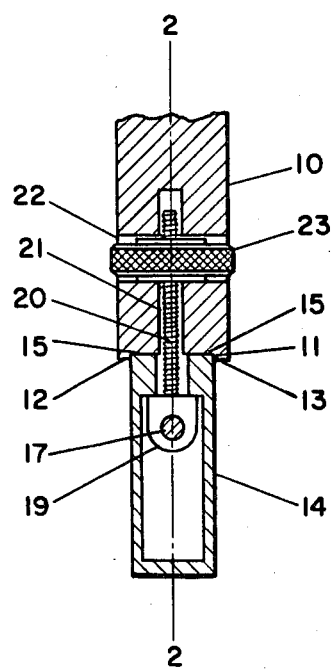
FIGURE 2 is a cross sectional view taken along line 2—2 of FIGURE 1.

Referring now to the drawings, and particularly FIGURES 1 and 2, the base of my effective diameter gauge is indicated generally at 10. A straight slideway 11 having tongues 12 and 13 is formed along one edge of the base 10. A generally rectangular slide member 14 is formed with a pair of slides 15 arranged so that the outer side of the slides 15 engages the slideway 11 of the base 10 with sliding contact. A threaded shaft 17 terminating in a knurled adjusting knob 18 is connected to slide member 14 and is free to rotate within a longitudinal cavity formed in the slide member 14. Mounted on the threaded shaft 17 within the slide member 14 is an elongated clamping nut 19 formed with a flat side adapted to engage the inner side of the slides 15 of the slide member 14. The clamping nut 19 is also provided with a tapped hole in which a locking screw 20 is positioned. The locking screw 20 passes through a cavity 21 formed in the base 10 and into an elongated hole 22 also formed in the base 10. A knurled lock nut 23 threaded on the screw 20 is located within the elongated hole 22.

The position of the slide member 14 relative to the base 10 may be adjusted by rotating the knurled knob 18 so that the threaded shaft 17 is moved longitudinally with respect to the clamping nut 19. When the slide member 14 has been adjusted to the desired position it may be locked in that position by tightening the lock nut 23 whereby the clamping nut 19, the slides 15 of the slide member 14 and the slideway 11 of base 10 are brought into clamping engagement.

A V-block assembly, indicated generally at 24, is fastened to one end of the slide member 14 by screws 25. The V-block assembly 24 comprises a pair of 90-degree V-blocks, 26 and 27 juxtaposed in mutually parallel spaced relation, a gauge reference plane 28 extending in the space between the V-blocks 26 and 27, and a mounting block 29, the V-block assembly being assembled so that the gauge reference plane 28 is parallel to a plane passing through the apexes of the V-blocks 26 and 27 and bisecting the 90-degree angle formed by the faces of the V-blocks. Thus, both faces of each V-block make an angle of 45 degrees with the gauge reference plane 28.

A dial indicator assembly 30 comprises a dial indicator 31 having a movable contactor 32 terminating in a rounded measuring tip 32a, and a mounting block 33. The dial indicator 31 is attached to the mounting block 33 by means of a jam nut 34, the mounting block having an interior bore through which the movable contactor 32 of the dial indicator 31 may pass freely. The dial indicator assembly 30 is fastened to the base 10 by screws 35 passing through the mounting block 33 and into the base 10.

The position of the dial indicator assembly 30 relative to the V-block assembly 24 is of critical importance in my effective diameter gauge. In accordance with my invention, the axis of the movable contactor 32 of the dial indicator assembly 30 which is located between the V-blocks 26 and 27 must be normal to the gauge reference plane 28 of the adjustable V-block assembly 24 so that the line of motion of the movable contactor 32 will always intersect the planes defined by the faces of the V-blocks 26 and 27 at an angle of 45 degrees. Furthermore, the position of the V-blocks relative to the contactor 32 must be adjustable so that the extended axis of the movable contactor 32 will pass through the center of a round of any size which may be located in the V-block assembly.

Figure 7:
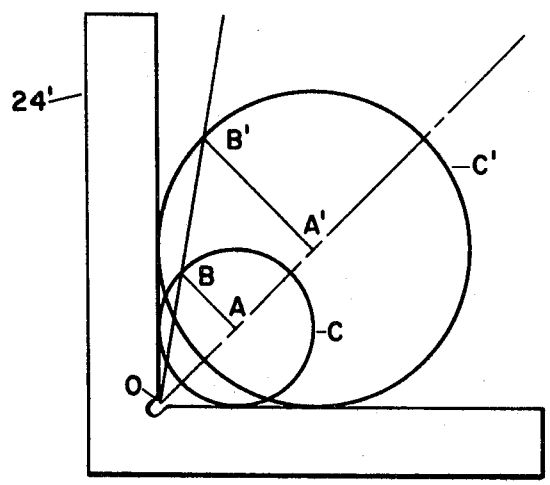
FIGURE 7 is a diagrammatic view of two perfect rounds seated in the 90° V-block assembly.

Referring now to FIGURE 7, a V-block assembly 24' is diagrammatically shown forming a 90° angle at O bisected by the line OAA'. Two circles, C and C', are shown representing two perfect rounds seated in the V-block assembly whose centers are located respectively at A and A' on the bisector OAA'. Radii AB and A'B' are each perpendicularly to the line OAA'. It can be readily demonstrated that the line OBB' is the locus (on the left of the bisector as viewed in FIG. 7) of the outer ends of all radii perpendicular to line OAA' of all circles whose centers lie along the line OAA' extended which are tangent to the 90° V-block assembly 24'.

It can also be readily demonstrated that the cosecant of the angle AOB formed between the bisector OAA' and the locus OBB' is equal to the square root of 3. In other words, the ratio of OB to BA is equal to the ratio of OB' to B'A' and both ratios are equal to the square root of 3.

The locus line OBB' is used in accordance with my invention to establish the zero setting of my gauge for each nominal size of round that is being measured. It will be noted that for each position of the slide member 14 on the base 10 the axis of the contactor 32 remains normal to the gauge reference plane 28 and also to the bisector of the 90° V-block angle. However, to ensure that the gauge can be properly zeroed for each nominal size round to be measured, the arrangement is such that the angle formed by the path of the slide member 14 with the gauge reference plane 28 and the V-block angle bisector is substantially equal to the angle whose cosecant is equal to the square root of 3. To this end, in the present embodiment I mount the V-block assembly 24 on the slide member 14 so that the plane of the gauge reference plane 28 intersects the plane defined by slides 11 of member 14 at an angle of from 35 degrees to 36 degrees. Preferably, this angle is held as close as practical to the angle whose cosecant is equal to the square root of 3, i.e. an angle substantially equal to 35 degrees 16 minutes for best results.

The operation of my effective diameter gauge will now be described with reference to the measurement of the effective diameter of a round bar having a nominal diameter of one inch. To set the gauge for this measurement, the lock nut 23 is loosened so that the slide member 14 may be adjusted and standard gauge blocks are assembled on the gauge reference plane to a height equal the perpendicular distance between the gauge reference plane 28 and the plane which bisects the angle of the V-blocks 26 and 27 plus half an inch. The perpendicular distance between the gauge reference plane 28 and the plane which bisects the V-block angle is termed the gauge constant and is an arbitrary distance fixed by the construction of the gauge as indicated by arrows A in FIGURE 1. With standard gauge blocks assembled on the gauge reference plane to a height equal to the gauge constant plus one-half inch, the position of the slide member 14 is adjusted by turning the adjusting knob 18 until the distance between the measuring tip 32a of the movable contactor 32 is equal to the gauge constant plus one-half inch, and the measuring tip 32a engages the upper surface of the standard blocks with the dial indicator approximately zeroed. The lock nut 23 is then tightened to lock V-block assembly 24 in this position and the dial indicator is set to its "zero" position. The gauge blocks are then removed. With the gauge so adjusted, when a perfect round having a diameter of exactly one inch is positioned in the V-block assembly, the axis of the round will lie in the plane which bisects the 90-degree V-block angle and the measuring tip 32a of the movable contactor 32 will contact the round at a radius which is perpendicular both to the plane which bisects the V-block angle and the gauge reference plane 28 and the dial indicator will read "zero." As the perfect round is rotated within the V-blocks, the dial indicator will continue to read "zero" since every point on the surface of the round is precisely one-half inch from the axis of the round.

To measure the effective diameter of a round having a nominal diameter of one inch, but an odd number of lobes, the round is placed in the V-block assembly and rotated. As the tip of a lobe approaches the measuring tip 32a, the measuring tip will be displaced away from the plane which bisects the V-block angle. When the tip of the lobe of the round is in contact with the measuring tip 32a, the measuring tip will be at a maximum outward displacement and at this time the line of the axis of the contactor 32 as extended will pass through the center of the lobed round. This condition is illustrated by the solid lines in FIGURE 3 for a 3-lobed round and by the solid lines in FIGURE 4 for a 5-lobed round.

At some point, approximately midway between two lobes, the measuring tip 32a will be displaced a minimum distance from the plane which bisects the V-block angle and the line of the axis of the contactor as extended will again pass through the center of the lobed round. This condition is illustrated by the dashed lines in FIGURE 3 for a 3-lobed round and by the dashed lines in FIGURE 4 for a 5-lobed round.

As a 3-lobed round is rotated through 360 degrees in the V-blocks, the dial indicator registers three maximum and three minimum readings while a 5-lobed round produces five maximum and five minimum readings when rotated through 360 degrees. Generalizing, when a round having an odd number of lobes is rotated through 360 degrees there will be a pair of maximum and minimum readings corresponding to each lobe. Consequently, the number of lobes on a round having an unknown odd number of lobes may be determined by rotating the round through 360 degrees and observing the number of maximum readings shown by the dial indicator.

Figure 3:
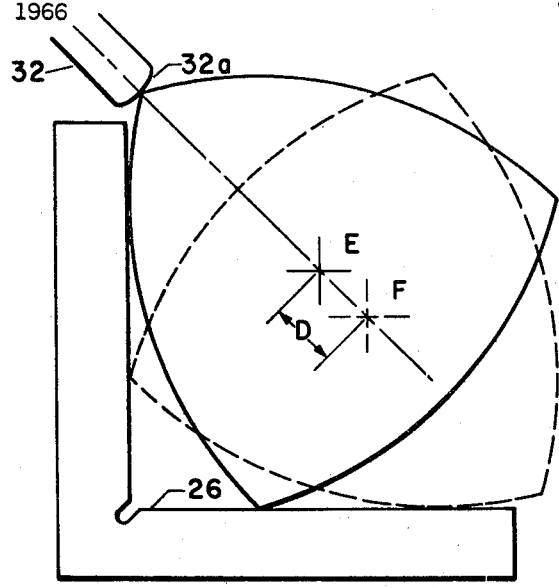
FIGURE 3 is a diagrammatic sketch showing two extreme positions of a 3-lobed round in the 90-degree V-block of the gauge of the present invention.
Figure 4:
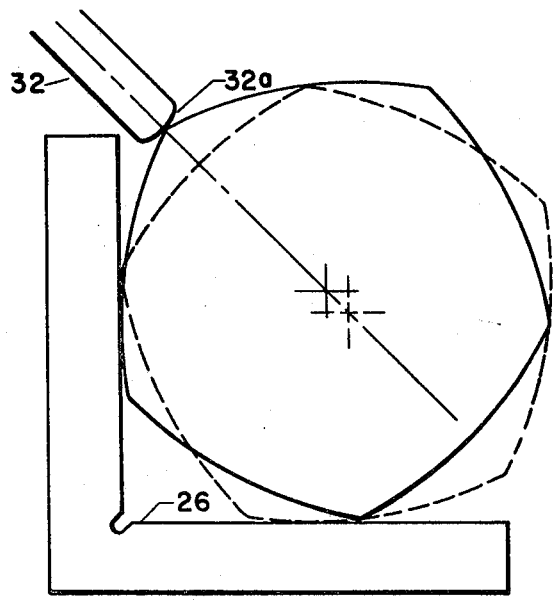
FIGURE 4 is a diagrammatic sketch, similar to FIGURE 3, showing two extreme positions of a 5-lobed round in the 90-degree V-block of the gauge of the present invention.

The significance of the indicator readings in terms of out-of-roundness may be explained with reference to FIGURE 3. As a lobed round is rotated in the 90-degree V-block the center of the round describes a circle having a diameter D which is equal to the difference between the major and the minor radii of the lobed round. When the measuring tip 32a is in contact with the tip of a lobe, the center of the lobed round is at the point E on an extension of the axis of the movable contactor 32 and, as stated above, the dial indicator 31 registers a maximum reading. When the lobed round has been rotated approximately midway between two lobes so that the measuring tip 32a is in contact with a minimum radius of the lobed round, the center of the lobed round is located at the point F on an extension of the axis of the movable contactor and the dial indicator registers a minimum reading. The difference between the maximum and minimum readings of the dial indicator is equal to the difference between the maximum and minimum radii of the round plus the diameter D of the circle described by the center of the round. As the nominal diameter of the round is ordinarily intermediate the maximum and minimum diameters of the round and the dial indicator was set to read "zero" for a perfect round whose diameter was equal to the nominal diameter, the maximum and minimum readings of the dial indicator are a direct measurement of the out-of-roundness of the lobed round expressed as a variation from the nominal diameter. In other words, the nominal diameter of the round plus the maximum dial indicator reading equals the diameter of the minimum size of ring gauge through which the round will pass. In like manner, the nominal diameter of the round less the minimum dial indicator reading equals the maximum diameter at which a true round can be obtained by machining the lobed round.

My effective diameter gauge therefore provides for a round having an odd number of lobes the same measurement of out-of-roundness as is produced with a precision spindle. However, my effective diameter gauge is well adapted for production line use since it is merely necessary to place the lobed round in the V-blocks, rotate it through 360 degrees and observe the maximum and minimum dial indicator readings while the use of a precision spindle requires a time consuming operation to locate the exact center of the round and then measure the actual radius of the round. Although, as stated above, my effective diameter gauge provides the same measurement of the maximum and minimum diameter, i.e. out-of-roundness, of a lobed round as is provided by a precision spindle, it is important to recognize that, in contrast to the precision spindle, my effective diameter gauge provides a measurement of the actual diameter of a round only when the center of the round lies on an extension of the axis of the movable contactor of the dial indicator. Thus, all dial indicator readings other than the maximum and minimum cannot be interpreted in terms of the actual diameter of the round. However, since the purpose of my gauge is to measure the maximum and minimum diameter of a lobed round having an odd number of lobes and, in some cases, to determine the number and position of the lobes, this limitation in the significance of the dial indicator readings is of no practical consequence in the use of my effective diameter gauge.

Figure 5:
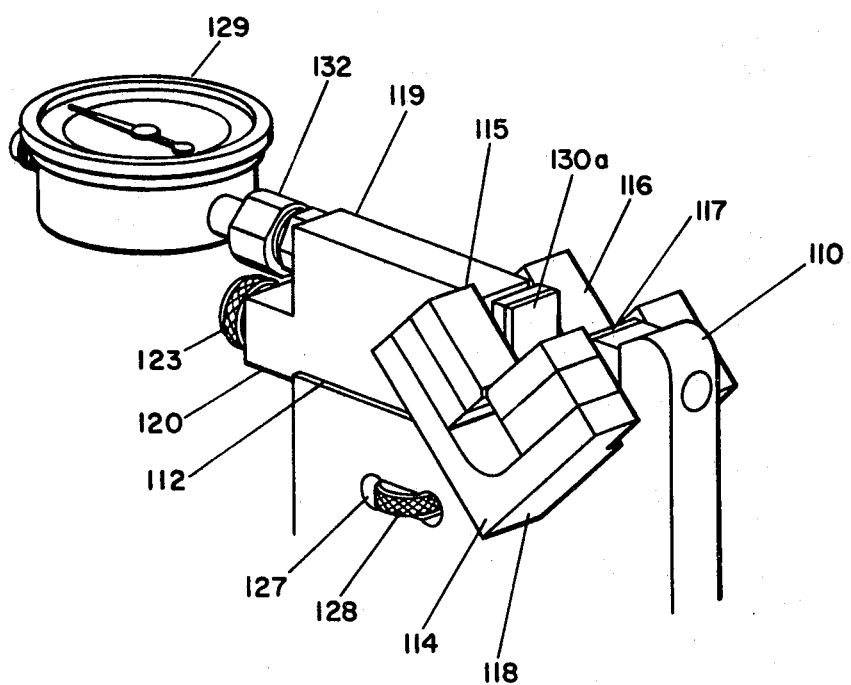
FIGURE 5 is a perspective view of another embodiment of the effective diameter gauge made in accordance with the present invention.
Figure 6:
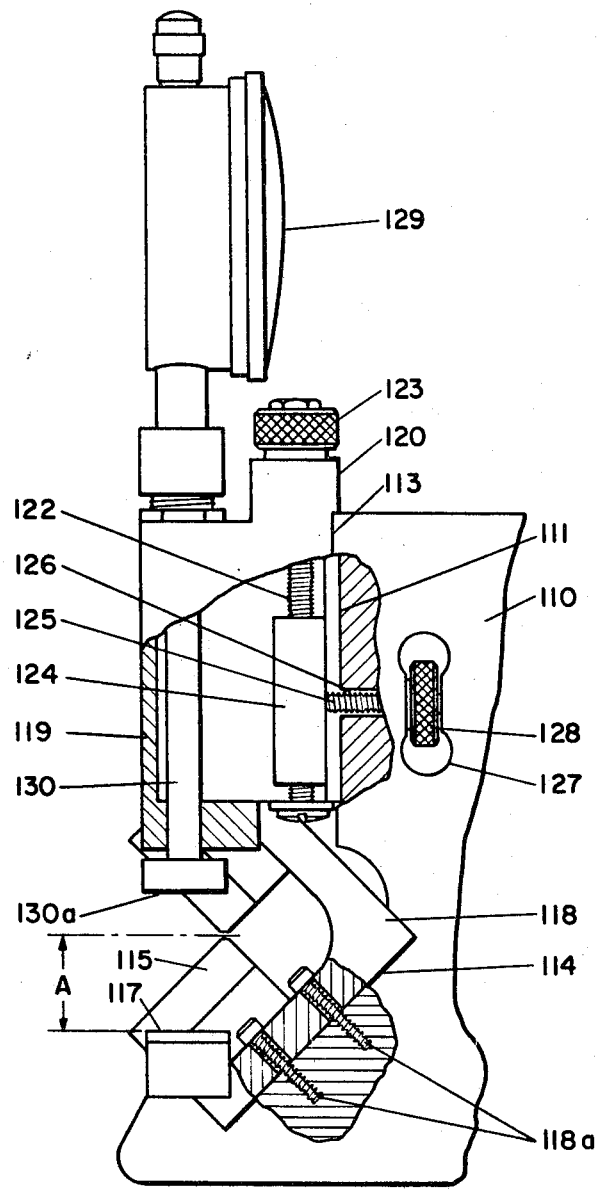
FIGURE 6 is a side elevational view of the gauge of FIGURE 5 partially cut away to show more clearly the details of construction.

Another embodiment of my effective diameter gauge is shown in FIGURES 5 and 6. The essential difference between the two embodiments is that in the form of the gauge shown in FIGURE 1 the V-block assembly is the movable element while in the form in FIGURES 5 and 6, the V-block assembly is stationary and the dial indicator assembly is the movable element. In other respects, the embodiments of FIGURES 1 and 2 and that the FIGURES 5 and 6 differ only in minor details.

Referring now to FIGURES 5 and 6, the base is indicated at 110. A slideway 111 and tongue elements 112 and 113 are formed on one side of the base 110. Adjacent the lower end of the slideway 111 is the V-block assembly 114. The V-block assembly 114 comprises two 90-degree V-block units 115, 116, juxtaposed in mutually parallel spaced relation, a gauge reference plane 117 positioned at an angle of 45 degrees to each face of the V-block units 115 and 116 and extending in the space between the V-blocks 115 and 116 and a mounting block 118. The V-block assembly is fastened to the base 110 by screws 118a so that the gauge reference plane 117 is perpendicular to the slideway 111 and each face of the V-block units 115, 116 is positioned at an angle of 45 degrees to the slideway 111.

A generally rectangular slide member 119 is formed with a pair of slides 120 so that the outer edge of the slides engages the slideway 111 with sliding contact and the slide member 119 is guided between the tongues 112 and 113 of the base 110. A threaded shaft 122 terminating in a knurled adjusting knob 123 is connected to the slide member 119 and is free to rotate within a longitudinal cavity formed in the slide member 119. Mounted on the threaded shaft 122 within the slide member 119 is an elongated clamping nut 124 formed with a flat side adapted to engage the inner sides of the slides 120 of the slide member 119. The clamping nut 124 is also provided with a tapped hole in which a locking screw 125 is positioned. The locking screw 125 passes through a cavity 126 formed in the base 110 and into an elongated hole 127 also formed in the base 110. A knurled lock nut 128 threaded on the locking screw 125 is located within the elongated hole 127.

The position of the slide member 119 relative to the base 110 and the V-block assembly 114 may be adjusted by rotating the knurled knob 123 so that the threaded shaft 122 is moved longitudinally with respect to the clamping nut 124. When the slide member 119 has been adjusted to the desired position it may be locked in that position by tightening the lock nut 128 whereby the clamping nut 124, the slide 120 of the slide member 119 and the slideway 111 of the base 110 are brought into clamping engagement.

A dial indicator assembly comprising a dial indicator 129 having a movable contactor 130 terminating in a contact plane 130a, and a jam nut 132 is mounted on the slide member 119 so that the axis and line of motion of the movable contactor 130 of the dial indicator 129 is parallel to the slides 120 of the slide member 119 and the contact plane 130a is parallel to the gauge reference plane 117.

The operation of this embodiment of my effective diameter gauge is similar to that described above. When a round having an odd number of lobes and a nominal diameter of one inch is to be gauged for out-of-roundness, standard gauge blocks are assembled on the gauge reference plane to a height equal to the gauge constant, i.e. the perpendicular distance between the gauge reference plane 117 and the plane which bisects the 90-degree V-blocks, plus one-half inch. With the lock nut 128 loosened, the slide member 119 is adjusted by rotating the knurled adjusting nut 123 until the contact plane 130a is in contact with the stack of standard gauge blocks and the needle of the dial indicator is approximately zeroed. The slide member 119 is then locked into position by tightening the lock nut 128 and the dial indicator set to "zero." My effective diameter gauge is now adjusted so that if a perfect round is placed in the V-blocks, the dial indicator will register "zero,'" and remain at "zero" as the perfect round is rotated in the V-blocks.

The lobed round to be gauged may then be placed in the V-blocks and rotated 360 degrees therein. As explained above, the dial indicator will register a series of maximum and minimum readings corresponding to the lobes existing on the round. When my effective diameter gauge is adjusted to gauge lobed rounds of a particular nominal size, the rounds may be gauged rapidly so that my gauge is well suited to production line use and the maximum and minimum gauge readings may be interpreted directly in terms of variations in the diameter of the lobed round, as explained above.

Figure 8:
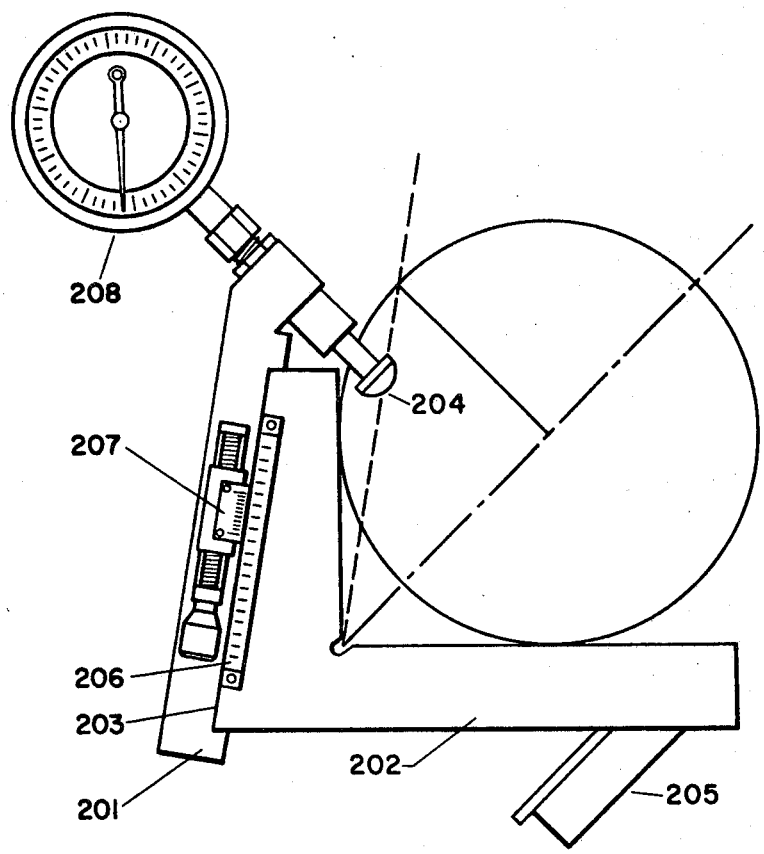
FIGURE 8 is a side elevational view, partially diagrammatic, of yet another embodiment of the effective diameter gauge made in accordance with the present invention.

In accordance with my invention a gauge can also be readily provided by means of which the effective or actual diameter of a round can be read directly from a dial indicator used in conjunction with a scale, as will now be described in connection with FIGURE 8.

A slide member 201 carrying a dial indicator assembly 208 is slidably mounted for a movement relative to 90° V-block assembly 202. The arrangement may be similar to that described in connection with FIGURE 6, but as shown in FIGURE 8, the slideway 203 along which the slide member 201 engages the V-block assembly 202 extends parallel to the locus of the outer ends of radii perpendicular to the bisector of the V-block angle. In other words, the slideway 203 forms substantially the same angle with the bisector of the 90° angle of the V-block assembly as the angle BOA in FIGURE 7, and is constructed so that its cosecant is as close as is practical to being equal to the square root of 3. As before, the indicator assembly 208 is fixed to the slide member 201 so that its movable contactor 204 extends with its axis normal to the bisector of the 90° angle of the V-block assembly and to the gauge reference plane 205.

A graduated scale 206 is fixed to the V-block assembly 202 and extends parallel to the slideway 203. To take into account the proportionality factor between a distance along the slideway 203 which corresponds to a given displacement of the contactor 204 along a radius perpendicular to the bisector of the V-block angle, the scale 206 is graduated in multiples of the square root of 3. With the scale expanded so that unit length is equal to the square root of 3 inches, when the gauge is properly adjusted, the radius of the round being measured is equal to the reading of the scale 206 plus or minus half the reading of the dial indicator. On the other hand, with the scale contracted so that unit length is equal to one-half the square root of 3, when the gauge is properly adjusted, the diameter of the round is equal to the reading of the scale 206 plus or minus the reading of the dial indicator.

As was described in connection with the embodiments shown in FIGURES 1 and 6, the indicator assembly 208 is zeroed with standard gauge blocks. With the indicative reading zero with standard gauge blocks for a 1 inch round, an indicator 207 mounted on the slide member 201 should intersect the scale 206 at the "1 inch" or "½ inch" graduation depending upon whether the scale was constructed using one-half the square root of 3 or the square root of 3 as the proportionality factor. Preferably, minor discrepancies such as may result from normal manufacturing tolerances are minimized by shifting the indicator 207 and the scale 206 relative to each other while holding the slide member 201 fixed relative to the V-block assembly. This is conveniently carried out by slidably mounting the indicator 207 on the slide member 201 so that the indicator 207 can be shifted longitudinally along the slide member by means of a micrometer screw.

Preferably, the scale 206 is contracted so that the intervals between "0" and "1," "1" and "2," "2" and "3" etc. are each equal to one-half the square root of 3 inch for the direct reading of effective diameter. The accuracy of the gauge may be readily checked by using standard gauge blocks corresponding to the diameter of various perfect rounds and determining whether or not the indicator 207 intersects the scale 206 at the proper place when the dial indicator is zeroed. Once the accuracy of the effective diameter gauge has been established, the gauge may be used for measuring the effective diameter of commercial rounds of various sizes without the use of standard gauge blocks since the gauge may be preset to the desired nominal size by moving the slide member 201 until the indicator 207 appears opposite the desired reading on the scale 206.

In use, once the gauge has been preset for the particular size round to be measured, the round is inserted into the V-block assembly and rotated until a maximum reading is obtained on the dial of the indicator assembly. The effective diameter of the round is then equal to the sum of the scale reading and the indicator reading. As before, the number and position of the lobes may be determined by rotating the round in the V-block assembly and noting the number and location of the maximum readings shown on the indicator of the dial assembly.

The terms and expressions which have been employed are used as terms of description and not of limitation and there is no intention in the use of such terms and expressions of excluding any equivalents of the features shown and described or portions thereof, but it is recognized that various modifications are possible within the scope of the invention claimed.

What is claimed is:

1. A gauge for measuring the out-of-roundness of rounds having an odd number of lobes, comprising a base, means forming a 90° V-block, measuring means including a movable contact member, and means connecting said V-block forming means and said measuring means to said base with said contact member movable normal to a plane bisecting the 90° angle of the V-block and including means for selectively adjusting and fixing the distance between said V-block and said measuring means thereby to change the distance between the zero position of said contact member and said plane for accommodating rounds between said V-block and said contact member having nominal sizes which differ by an amount that is large compared to their out-of-roundness.

2. A gauge for measuring the out-of-roundness of rounds having an odd number of lobes, comprising a base, a pair of 90° V-blocks in mutually spaced parallel relation, means forming a reference plane extending between said V-blocks parallel to a plane bisecting the 90° angle of said V-blocks, measuring means including a contact member extending toward and movable relative to said reference plane along a line normal to said reference plane, and means connecting said V-blocks, said reference plane forming means and said measuring means to said base and including means for selectively adjusting the distance between said V-blocks and said contact member.

3. A gauge for measuring the out-of-roundness of rounds having an odd number of lobes, comprising a base, a pair of 90° V-blocks in mutually spaced parallel relation, means forming a reference plane extending between said V-blocks parallel to a plane bisecting the 90° angle of said V-blocks, measuring means including a contact member extending toward and movable relative to said reference plane along a line normal to said reference plane, said contact member having a planar contact surface presented toward said V-blocks and said reference plane, and means connecting said V-blocks, said reference plane forming means and said measuring means to said base and including means for selectively adjusting the distance between said V-blocks and said contact member.

4. A gauge for measuring the out-of-roundness of rounds having an odd number of lobes, comprising a base, a pair of 90° V-blocks, means connecting said V-blocks to said base with said V-blocks in mutually spaced parallel relation, means on said base forming a reference plane extending between said V-blocks parallel to a plane bisecting the 90° angles of said V-blocks, measuring means including a movable contact member, means adjustably supporting said measuring means on said base for movement toward and away from said V-blocks and said reference plane with said contact member extending toward and movable relative to said reference plane along a line normal to said reference plane.

5. A gauge for measuring the out-of-roundness of rounds having an odd number of lobes, comprising a base, a pair of 90° V-blocks connected to said base in mutually spaced parallel relation, means on said base forming a reference plane extending between said V-blocks parallel to a plane bisecting the 90° angles of said V-blocks, a slide movably mounted on said base for movement toward and away from said V-blocks and said reference plane along a line normal to said reference plane, measuring and indicating means including a movable contact member carried by said slide, said contact member being movable relative to said slide along a line normal to said reference plane, and means for releasably locking said slide to said base.

6. A gauge as set forth in claim 5 wherein said contact member has a planar contact surface presented toward said V-blocks and said reference plane and extending parallel to the latter.

7. A gauge for measuring the out-of-roundness of rounds having an odd number of lobes, comprising a base, measuring means connected to said base and including a contact member movable along a fixed line, a pair of 90° V-blocks, means adjustably supporting said V-blocks on said base in mutually spaced parallel relation for movement toward and away from said contact member with a plane joining the bisectors of the 90° angles of said V-blocks maintained normal to said line, and means forming a reference extending between said V-blocks and parallel to said plane.

8. A gauge for measuring the out-of-roundness of rounds having an odd number of lobes, comprising a base, measuring and indicating means fixed to said base and including a contact member movable along a fixed line, a slide, a 90° V-block assembly and means forming a reference plane fixed to said slide with said reference plane extending parallel to a plane bisecting the 90° angle of said V-block assembly, means movably connecting said slide to said base with said slide and the V-block assembly and reference plane carried thereby movable toward and away from said measuring and indicating means while maintaining said reference plane normal to said line, and means for releasably latching said slide to said base.

9. A gauge as set forth in claim 8 wherein said base has a slideway formed therein, said slide engages said slideway, a threaded shaft is rotatably mounted on said slide, a clamping block is threaded on said shaft, and means on said base fixing said clamping block against movement relative to said base along said shaft and for drawing said clamping block toward said base whereby to lock said slide to said base.

10. A gauge as set forth in claim 9 wherein said slideway forms an angle of about 35° to 36° with the bisector of said 90° angle.

11. A gauge suitable for measuring rounds having an odd number of lobes, comprising means forming a 90° V-block, measuring means including an axially movable contact member, and means connecting said measuring means to said 90° V-block with said measuring means and said 90° V-block displaceable relative to one another along a plane parallel to a line forming a locus of the outer ends of the radii of all circles tangent to the opposite arms of said 90° V-block having their centers on the bisector of the 90° V-block angle, said radii being perpendicular to said bisector, and with the axis of said contact member being maintained perpendicular to said bisector.

12. A gauge suitable for measuring rounds having an odd number of lobes, comprising means forming a 90° V-block, measuring means including an axially movable contact member for engaging rounds seated in said 90° V-block, and means connecting said measuring means to said 90° V-block with said measuring means and said 90° V-block displaceable relative to one another with the axis of said contact member being maintained perpendicular to the bisector of the 90° V-block angle and said contact member meeting the circumferences of all circles tangent to the opposite arms of said 90° V-block with their centers on said bisector at points lying in a line forming a locus of the outer ends of the radii of said circles that are perpendicular to said bisector.

References Cited

UNITED STATES PATENTS 1,845,199   2/1932   Schnuck.

FOREIGN PATENTS 647,674   7/1937   Germany.

SAMUEL S. MATTHEWS, *Primary Examiner.*